Jan. 14, 1964    E. O. SCHWEITZER    3,117,459
TOOTHED TRANSMISSION BELT
Filed July 21, 1961

INVENTOR
EARL O. SCHWEITZER

BY  *Eber J. Hyde*
ATTORNEY

United States Patent Office 3,117,459
Patented Jan. 14, 1964

3,117,459
TOOTHED TRANSMISSION BELT
Earl O. Schweitzer, Wickliffe, Ohio, assignor to
Clevite Corporation, a corporation of Ohio
Filed July 21, 1961, Ser. No. 125,688
4 Claims. (Cl. 74—229)

This invention pertains to a transmission belt, and more particularly to a toothed, rubber-like belt for coupling between a small pinion gear and a larger gear or a smooth drum. There are many places where smooth, quiet, vibration-free operation of gears is required, as in instruments needing low noise levels for measuring small quantities, and as in various devices which require silent operation.

In some of the devices requiring smooth operation, O-rings have been used as transmission belts, but they often are unsatisfactory due to slippage because their wrap around a small shaft is insufficient. By "wrap" is meant the amount of the belt which is in frictional engagement with the shaft. When considerable diameter ratio exists between closely spaced gears, the angle of wrap of a belt on the smaller gear is so small that it prevents effective coupling between the gear and the belt. O-rings have to be tight in order to achieve the frictional coupling desired. Thus, as the rubber gets older and stretches, the frictional coupling drops to an unsatisfactory level. The high tensional forces which are initially required lead to power loss, stretching of the rubber and more costly bearings.

Rubber-like belts with teeth have been used, such for example as timing belts which have special profile large pitch teeth, and these generally have been satisfactory because of their toothed coupling to the special profile flanged large pitch gears in the transmission system. Tension in the timing belt may be less than in O-rings easing the stretching problem and improving the wear on the bearings. However, no one makes a toothed belt with small pitch teeth to operate with a readily available small pitch involute pinion. Consequently, it has not been possible until the present invention to employ a toothed, rubber-like transmission belt between a small involute pinion and a larger involute gear or a larger smooth drum. The reason for this being that as the belt bends to a small diameter as it goes around the pinion, the spaces between its teeth close in to the point where the teeth on the pinion will not mesh with the teeth of the belt.

The present invention relates to a transmission belt which is so designed that its teeth do not close in as it goes around a gear of any diameter, even around a very small pinion, thereby permitting the use of standard small pitch involute gears with consequent saving over the special gears, and for the first time a standard small involute pinion can be coupled to a closely spaced standard larger involute gear by a toothed rubber-like belt. The diameter of the gear does not affect proper tooth engagement between the gear and the belt.

It is, therefore, an object of the present invention to provide a rubber-like, toothed transmission belt which will successfully operate in conjunction with a small involute gear or pinion.

A further object of the present invention is to provide a toothed transmission belt whose internal teeth will not close in to the degree that it it will not operate with a small gear or pinion.

Still another object of the invention is to provide an internally toothed transmission belt having spaces between its teeth which remain open even though the belt is bent around a very small gear or pinion.

For a better understanding of the present invention, together with other and further objects thereof, reference is had to the following description taken in connection with the accompanying drawings, and its scope will be pointed out in the appended claims.

An aspect of this invention lies in the provision of a transmission belt preferably made of rubber or rubber-like material, and preferably in the form of a closed loop. The belt has a back section which may be solid or perforate and has teeth formed on its inner face, the teeth being of a given depth. In one embodiment of the invention there are two edge sections integrally connected to the teeth and the back section and located at either side of the teeth. The edge sections are of a depth greater than the depth of the teeth and they extend in the same direction as the teeth so that they terminate at a location beyond the top edges of the teeth, so that the neutral axis of bending of the belt substantially coincides with the pitch diameter or line of the teeth.

Figure 1:
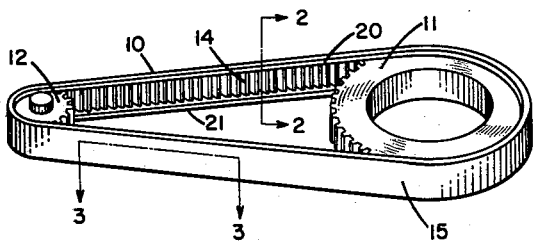
FIGURE 1 is an isometric view showing a belt of the present invention coupling a pinion to a larger gear.

With reference to the drawing, the belt of the present invention is identified by reference character 10, and it is shown coupling a gear 11 to a pinion or small gear 12 for the transmission of power therebetween.

Figure 2:
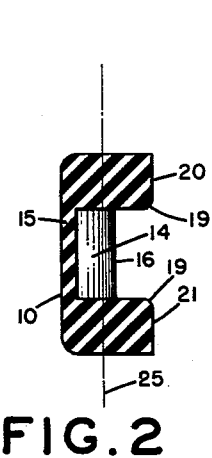
FIGURE 2 is a sectional view taken along line 2—2 of FIGURE 1, showing the two edge sections of the belt.
Figure 3:
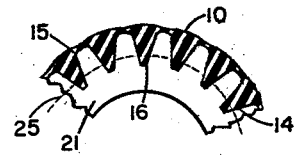
FIGURE 3 is a fragmentary sectional view taken along line 3—3 of FIGURE 1, showing the belt bent as it would be around a gear.

As shown clearly by FIGURES 1, 2 and 3, the belt 10 comprises a closed loop and it has teeth 14 on its inside face for meshing with the teeth of the gear 11 and the pinion 12. Preferably the belt is formed of rubber or rubber-like material, but the principles involved in its design are applicable to any flexible, moldable material which has sufficient strength to transmit the amount of power involved in a given installation.

Figure 6:
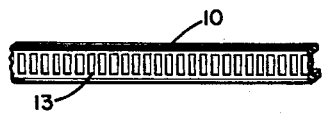
FIGURE 6 is a view of a modified device.

The belt 14 has an outside or back section 15 which preferably is thin for purposes which will become apparent, and the back section preferably is solid, although, as shown in FIGURE 6, it may be perforate. The teeth 14 are formed integrally with the back section 15 and are of a given depth shown best in FIGURES 2 and 3, and the teeth are on the inside face of the belt. Two edge section means 20, 21 are formed integrally with the teeth and with the back section 15, with one of the edge section means on either side of the teeth 14, and the edge sections are of a depth greater than the depth of the teeth and extend in the same direction as the teeth so that they terminate well beyond the top edges 16 of the teeth.

The amount of material in the back section 15, in the edge section means 20, 21 and the effective amount of the material in the teeth 14, are correlated so that the neutral axis of bending of the belt as a whole coincides with the pitch diameter or pitch circle of the teeth. This axis is identified by reference character 25 in FIGURES 2 and 3. The neutral axis of bending is a line extending through that portion of the belt which does not try to expand or contract as the belt is bent around a gear. When the neutral axis of bending coincides, or substantially coincides, with the pitch diameter of the teeth there is substantially no closing in of the space between the teeth as the belt goes around a small gear or pinion. The relatively heavy edge sections 20, 21 shift this neutral axis from a location (in the prior art belts) which lies within the back section 15, as shown in FIGURE 4, to a location near the pitch diameter of the teeth, as shown in FIGURE 3.

If the belt were made only of the back section 15 and the two edge sections 20, 21, the location of the neutral axis 25 would be where there was just as much material to one side of the axis as the other, as viewed in FIGURE 2. The material in the teeth has some small effect on the location of the axis, but because of the spaces between the teeth and because of the fact that the pitch diameter of the gear (when the belt is bent) falls on the neutral axis, the effect of the material in the teeth may usually be omitted in the design of the belt.

Figure 4:
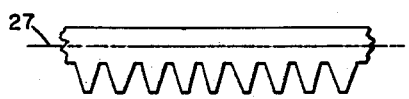
FIGURE 4 is a side view of a toothed rack (or extended gear) of the prior art.
Figure 5:
FIGURE 5 shows the rack of FIGURE 4 bent as it would be if it tried to go around a gear.

FIGURES 4 and 5 show why the edge sections 20, 21 are essential if the belt is to be bent around a small gear or pinion. FIGURE 4 shows a straight rack of the prior art type whose neutral axis of bending 27 lies in the back portion of the belt. FIGURE 5 shows this rack bent sharply as it would have to be to go around a small pinion. The material along the neutral axis does not try to expand or contract. The material above the neutral axis stretches and the spaces below the axis tend to close in, rendering the belt useless in conjunction with a small pinion. It is for this reason that small timing belts have had special teeth of very large pitch. Belts with large pitch teeth operating in conjunction with small gears having the same special large pitch teeth do not provide the necessary coupling and smooth operation essential for instrument use.

In the device of the present invention the spaces between the teeth stay open as shown in FIGURE 3. Thus the standard involute, small pitch teeth of the pinion 12 are readily accommodated and an excellent coupling is obtained between belt and pinion even though there is no great angle of wrap.

Figure 7:
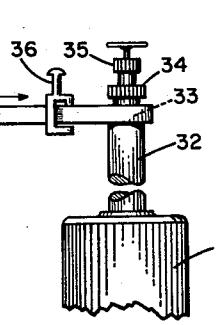
FIGURE 7 shows a modified use of the device of the present invention, wherein the drive is between three pinions and a large, smooth, untoothed drum.
Figure 8:
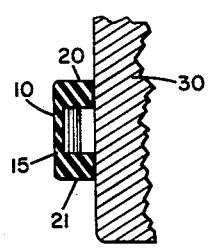
FIGURE 8 is a section along line 8—8 of FIGURE 7 showing the frictional coupling between the belt and the drum.

FIGURE 7 shows an excellent typical application of the toothed belt of this invention. Reference character 30 identifies a phonograph turntable. The drive motor 31 has an output shaft 32 on which is mounted three pinions 33, 34, 35, of suitable size to drive the turntable at the three speeds desired. The belt 10 is in frictional, not toothed, engagement with the turntable, as shown by FIGURE 8, and it is in toothed engagement with any one of the gears 33, 34, 35. A shifting lever 36 is used during operation to change speeds merely by shifting the belt from one gear to another. Since there is a large area of the belt in frictional contact with the turntable 30, and since there is an excellent coupling between the gears on the drive shaft 32 and the belt 10, the belt does not have to be tight.

Further incidental advantages of the belt of the invention lie in the fact that the edges 20, 21 form guiding ridges to maintain the belt on the gear, very much as a V-pulley guides a V-belt. To facilitate the proper meshing and engagement between the gear and the belt, the inside corners 19 of the edge sections 20, 21 are rounded. Also, since the back 10 preferably is solid, though thin, every space between two teeth forms an oil reservoir. Once the belt is uniformly oiled, it will carry its oil with it and distribute it over the gears for a very long time.

For belts with larger power transmitting ability it may be desirable that reinforcing elements be built into the belt. In this event the reinforcing elements should lie on the neutral axis where bending of the belt does not tend to stretch or compress the reinforcing elements.

While it is contemplated that most of the transmission belts made in accordance with this invention will have solid, though thin, back sections, it is within the scope of the present invention, as shown in FIGURE 6, that the back section be perforate. The portions of the back section 15 which lie between the teeth 14 can be open, as shown by reference character 13. This helps to shift the neutral axis 25 toward the outer edge 16 of the teeth, and somewhat reduces the amount of material in the edge section means 20, 21.

It will be appreciated from the previous description that prior art toothed belts, such as timing belts, had to have special gears with which to operate. The profile of the teeth on the small pinions operating with the timer belt had to be specially designed to allow for the closing in of the teeth. This meant that standard inexpensive gears could not be used.

With the belt of the present invention standard involute gears can be used for the large as well as for the pinion gears.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A toothed transmission belt for meshing with a gear comprising: a length of rubber-like material having a back section with teeth of a given depth formed on the inner face thereof which engages said gear when in operation, and having two edge section means integrally connected one on each edge of said back section, said edge section means being of a depth greater than the given depth of said teeth and extending in the direction of said teeth and terminating beyond the top edge of said teeth, said belt having a neutral axis of bending which substantially coincides with the pitch diameter of its teeth as said belt meshes with said gear whereby the spaces between the teeth do not close substantially.

2. A transmission belt as set forth in claim 1, further characterized by said back section being imperforate.

3. A transmission belt as set forth in claim 1, further characterized by said two edge sections being located to either side of said teeth.

4. A transmission belt comprising, two spaced apart side sections each formed of rubber-like material, each side section having a back face and a front face spaced apart a given distance to define a given depth, said back faces being aligned and said front faces being aligned, and teeth formed integral with and connected between said two side sections, the base of each tooth being located adjacent said aligned back faces of said side sections, and each tooth extending toward said aligned front faces and terminating short of said given depth so that the neutral axis of bending of said belt substantially coincides with the pitch diameter of said teeth.

References Cited in the file of this patent

UNITED STATES PATENTS

| | | |
|---|---|---|
| 2,770,977 | Beckadolph et al. | Nov. 20, 1956 |
| 2,937,538 | Worral | May 24, 1960 |